US012809591B2

(12) United States Patent
Deng et al.

(10) Patent No.: US 12,809,591 B2
(45) Date of Patent: Nov. 24, 2026

(54) NON-INTRUSIVE BUILD TIME INJECTION TOOL FOR ACCELERATING LAUNCHING OF CLOUD APPLICATIONS

(71) Applicant: Zoom Video Communications, Inc., San Jose, CA (US)

(72) Inventors: Zuzhi Deng, Hefei (CN); Zhuo Li, Hangzhou (CN); Tingming Zou, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 119 days.

(21) Appl. No.: 18/102,854

(22) Filed: Jan. 30, 2023

(65) Prior Publication Data

US 2024/0160412 A1 May 16, 2024

(30) Foreign Application Priority Data

Nov. 10, 2022 (CN) ......................... 202211406715.8

(51) Int. Cl.
*G06F 8/30* (2018.01)
*G06F 9/445* (2018.01)
*G06F 9/54* (2006.01)

(52) U.S. Cl.
CPC ................ *G06F 8/30* (2013.01); *G06F 9/445* (2013.01); *G06F 9/54* (2013.01)

(58) Field of Classification Search
CPC ............... G06F 9/54; G06F 9/445; G06F 8/30
USPC .......................................................... 717/106
See application file for complete search history.

(56) References Cited

U.S. PATENT DOCUMENTS

| | | | | |
|---|---|---|---|---|
| 8,495,570 B2 * | 7/2013 | Fortune | G06F 16/81 | 717/121 |
| 10,067,836 B1 * | 9/2018 | Chopra | G06F 11/1458 | |
| 12,020,025 B1 * | 6/2024 | Zhang | G06F 8/433 | |
| 2006/0248343 A1 * | 11/2006 | Eggebraaten | G06F 21/6218 | 713/182 |
| 2010/0031235 A1 * | 2/2010 | Volkov | G06F 8/51 | 717/120 |

(Continued)

OTHER PUBLICATIONS

EP International Search Report and Written Opinion for PCT/US2023/036850 mailed Feb. 19, 2024.

(Continued)

*Primary Examiner* — Bradford F Wheaton
(74) *Attorney, Agent, or Firm* — Kilpatrick Townsend & Stockton LLP

(57) ABSTRACT

Example methods and systems accelerate start-up time for cloud applications. A build time injection tool can access the source code for a cloud application to identify a subset of one or more resources referenced by the cloud application. The one or more resources are provided by one or more libraries. The one or more libraries include one or more library files. The build time injection tool can identify locations of the subset of the one or more resources within the one or more library files. The build time injection tool can generate a resource map for the cloud application, including a list of the subset of the one or more resources and corresponding locations within the one or more library files. A resource loading tool can access the resource map at runtime to find requested resources for the cloud application.

20 Claims, 10 Drawing Sheets

(56) References Cited

U.S. PATENT DOCUMENTS

| | | | | |
|---|---|---|---|---|
| 2011/0078182 | A1 * | 3/2011 | Fenyes | G06Q 30/0645<br>707/770 |
| 2017/0132024 | A1 * | 5/2017 | Desineni | G06F 8/61 |
| 2017/0255480 | A1 * | 9/2017 | Sakai | G06F 9/44521 |
| 2019/0075154 | A1 | 3/2019 | Zhang et al. | |
| 2020/0218528 | A1 * | 7/2020 | Bao | G06F 9/5055 |
| 2020/0233675 | A1 * | 7/2020 | Toal | G06F 9/44521 |
| 2024/0111589 | A1 * | 4/2024 | Sadov | G06F 9/4887 |

OTHER PUBLICATIONS

PCT/US2023/036850, "International Preliminary Report on Patentability", May 22, 2025, 8 pages.

PCT/US2023/036850, "International Search Report and Written Opinion", Feb. 19, 2024, 11 pages.

* cited by examiner

NON-INTRUSIVE BUILD TIME INJECTION TOOL FOR ACCELERATING LAUNCHING OF CLOUD APPLICATIONS

REFERENCE TO RELATED APPLICATION

This claims the benefit of priority under 35 U.S.C. § 119(a) to Chinese Patent Application No. 202211406715.8, filed Nov. 10, 2022, the entirety of which is hereby incorporated by reference herein.

FIELD

The present application generally relates to executing cloud applications and more specifically relates to a non-intrusive build time injection tool for accelerating launching of cloud applications.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
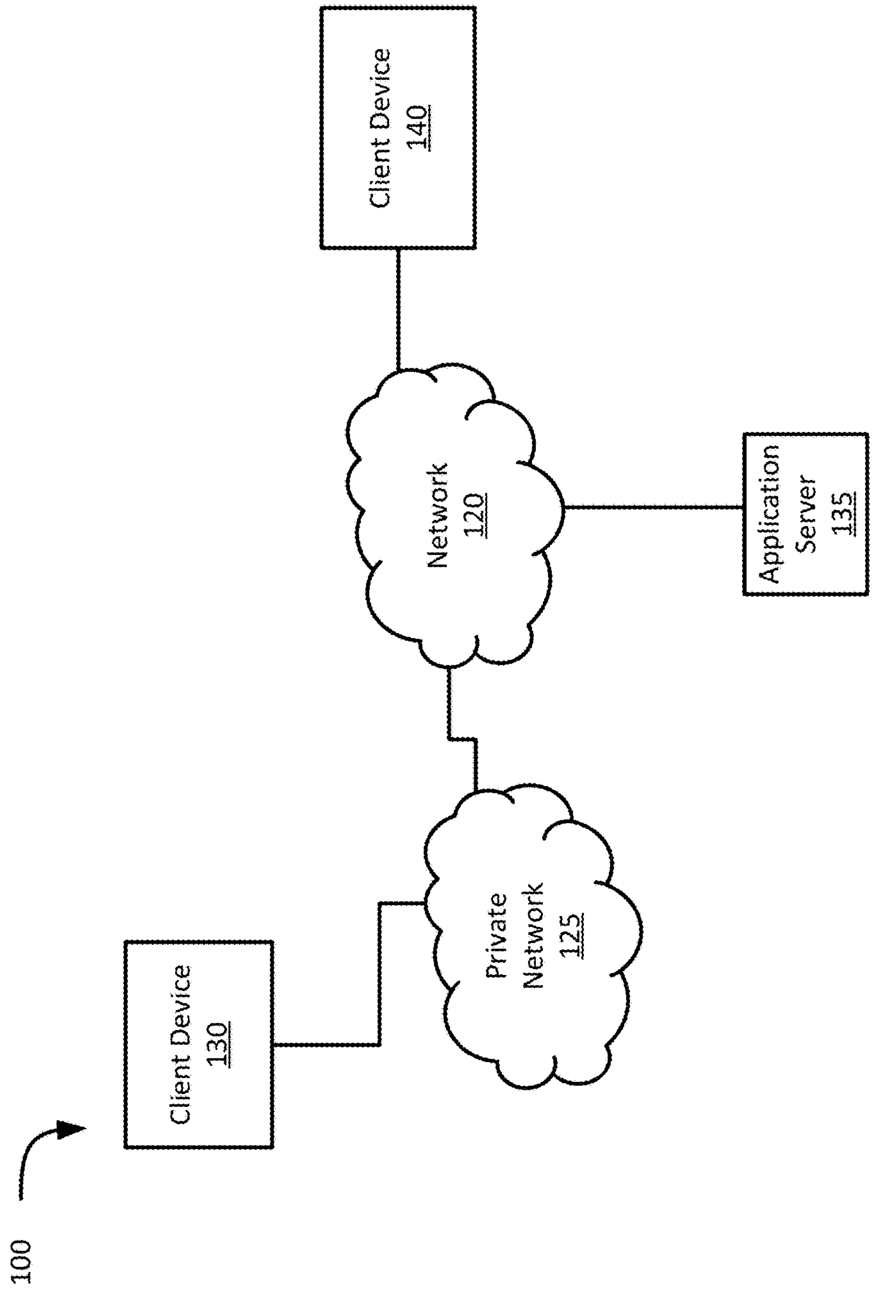
FIG. 1 shows an example system for launching a cloud application.

Examples are described herein in the context of executing cloud applications. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Cloud applications are often used to provide functionality to users without requiring the user to install and run an application on their own device. While some cloud native applications achieve fast start-up times, some commonly used cloud applications, such as a Java®-based cloud application (hereinafter a "Java application"), when executed in an execution environment, such as a Java Virtual Machine (JVM), can have prolonged start-up times. The prolonged start-up times are often caused by cumbersome mechanisms for class loading and profile guided compiler technology of the execution environment. In other words, present execution environments, when executing cloud applications, can slow down the start-up of the cloud applications, particularly when large numbers of classes need to be loaded. For example, start-up of a cloud application in current execution environments can take minutes. Slow start-up may be undesirable because slow start-ups can negatively impact the user experience, server-level agreements (SLA), product flexibility, development efficiency, and deployment stability of the cloud applications.

To make a cloud application more efficient in a modern, scalable cloud environment, the start-up time of the cloud application needs to be improved. Currently, there are some solutions for addressing the slow start-up time of cloud applications. The first solution is to compile a cloud application into static images. This solution, however, requires that the cloud application code be modified and can require disabling numerous features of the cloud application. A second solution is to pre-run the cloud application in a test environment to get a profile of the cloud application, including the application classes. The profile is then used during the start-up of the cloud application. The downside of the second solution is that extra work is needed for testing and release of the cloud application, thereby impacting the product release and cost. Moreover, modification of the application code and extra work during testing and release can extend the time needed to release the cloud application.

To address the slow start-up of cloud applications in present execution environments, example systems and methods for providing non-intrusive build time injection tools (hereinafter the "injection tool" or "injection tools") for cloud applications are provided herein. The example injection tools provided herein allow for more efficient and time effective start-up processes of cloud applications. For example, an injection tool can speed up the start-up of a Java application in a non-intrusive manner.

To reduce the start-up time of a cloud application, an example injection tool can identify resource locations at build time of the cloud application and store those locations in a resource map. This map can then be used by a resource loading tool when the application is launched to reduce the time spent on searching for resources at runtime. Importantly, the injection tool does not require any modification to the application code. The injection tool can generate a cloud application specific map that includes "build time" information to accelerate actions during runtime. The "build time" information can include pre-calculated resource indexes, which can be stored in a resource map and accessible to the runtime execution environment. The cloud application specific map can then be used by a resource loading tool, e.g., a Java class loader, to more efficiently find and load needed resources so that the resource loading time is reduced. To further speed up the start-up time, some initialization logic can be delayed or parallelized to reduce time consumption on initialization logics.

The systems and methods of the present disclosure can apply to many different types of application frameworks, including open-source frameworks, such as Spring® framework and Tomcat® framework. For example, the example injection tools described herein can be used within container-based cloud runtime environments, where applications are started and restarted frequently. Since the containers and application logic of the cloud application remains unmodified, a resource map created at build time can be used for locating resources at runtime. In some examples, the injection tool provided herein can speed up the start-up time of a cloud application by 20-25% without modifying the application code. For ease of discussion, an example is provided with reference to a Java application, however, it should be understood that the injection tool and related methods may be applicable to any type of cloud application.

In an illustrative example, at build time, the injection tool can access the source code of the Java application to identify the resources referenced in the source code. The injection tool then searches for the referenced resources contained in Java Archive (JAR) files and records corresponding paths via which the referenced resources can be found. A JAR file is a compressed file format typically for aggregating Java classes and associated resources into one file. The injection tool can then generate a resource map including a list of the resources referenced by the Java application and corresponding locations of the resources within the JAR files. The resource map can be a key-value map including keys and corresponding values. The keys can be the list of resources referenced by the Java application and the corresponding values can be corresponding library paths within the JAR files for the referenced resources.

The resource map can be stored in any suitable way so it can be uploaded to the cloud as a resource for the Java application, such as in a file according to a markup language, e.g., extensible markup language ("XML"), or in a plain text file. When the Java application is updated or the JAR files are modified, the resources referenced by the Java application may be updated. In such cases, the resource map may also need to be updated at subsequent build time to match the modified application or JAR files. However, if the Java application is built and the JAR files remain unmodified, the resource map may not require updating.

At runtime (e.g., when a Java application is launched), a class loader, which is a resource loading tool for the Java application, has been extended to access and use the resource map to efficiently search for specified resources. The extended class loader may read the resource map to quickly locate resources within the JAR files needed by the Java application. For example, when the resource map is in a format of a key-value map, the extended class loader may first check if a particular resource is listed as a key in the key-value map. If the particular resource is listed as a key in the key-value map, the extended class loader then identifies the corresponding value, which can be a library path to access the resource within a JAR file. Using the library path provided in the key-value map, the extended class loader can then find the particular resource in the JAR files. The extended class loader can reuse existing JAR file connections to reduce file I/O operations. The extended class loader can also skip reflection calls and throw shared exceptions to reduce time consumption.

If the particular resource is not listed in the key-value map, the extended class loader can search for the particular resource, such as by searching all of the relevant JAR files using a brute force search technique. In some examples, the extended class loader can also cache the search results for previously searched or located resources during runtime to create a class loading cache. When a particular resource is needed by the Java application, the extended class loader can search the class loading cache prior to searching the key-value map. If the particular resource is listed in the class loading cache, that is, the particular resource was previously searched or located, the extended class loader can identify the search result cached in the class loading cache. If the search result is a location, the extended class loader can load the particular resource based on the location to the cloud application. If the search result indicates that the particular resource is not found. The class loader can return null to the Java application. If the particular resource is not listed in the class loading cache, the class loader then searches the resource map as described in the paragraph above.

Compared to the existing solutions, this injection tool does not require any modification to the application code for accelerating launching of a cloud application. This allows the injection tool to be applicable to a wide range of cloud applications and easy to employ in existing frameworks. Additionally, the injection tool does not require many assumptions, allows all work to be done at build time, and does not break any Java or middleware specifications. Even though the techniques in the present disclosure are for accelerating launching of an application, it will be appreciated that these techniques can be implemented any time during runtime to reduce resource loading time and improve the application response times overall.

This illustrative example is given to introduce the reader to the general subject matter discussed herein and the disclosure is not limited to this example. The following sections describe various additional non-limiting examples and examples of spatial audio in virtual conference mingling.

Referring now to FIG. 1, FIG. 1 shows a system 100 for launching a cloud application. The system 100 includes an application server 135, which can be connected to multiple client devices, such as client device 130 and client device 140, via the network 120. The network 120 may be the internet. However, any suitable communications network or combination of communications network may be employed, such as local area networks (LANs), wide area networks (WANs), cellular networks, etc. The application server 135 can host various cloud applications available to the client devices 130 and 140. In different examples, these cloud applications may vary. The application server 135 provides cloud applications access to cloud databases, files, and other resources. Client device 140 may connect to the application server 135 over a public network 120. Client device 130 may connect with the application server 135 from within a private network 125, such as an office network or a virtual private network (VPN). One or both of client device 130 and client device 140 may launch a cloud application provided by the application server 135. To access various resources on the application server, client devices 130 and 140 can have client applications installed and may also have web applications accessible via a web browser, which may be stored as bookmarks in the web browser. The client devices 130 and 140 are computing devices, such as a computer, a tablet, a smartphone, or other computing devices.

In some examples, the application server 135 may include an execution environment, for example a JVM for executing Java applications. If one of the client devices 130 and 140 requests to launch a cloud application, the application server 135 may launch the application and begin searching for resources to launch the cloud application. For example, when the cloud application is a Java application, the application server 135 may be requested to launch the identified Java application. The cloud server may then use the resource map in conjunction with the JVM's class loader to obtain one or more resources contained in JAR files for launching the cloud application. As described above, using conventional techniques for searching the JAR files for the one or more resources, the cloud application may have a slow or prolonged start-up process.

Figure 2:
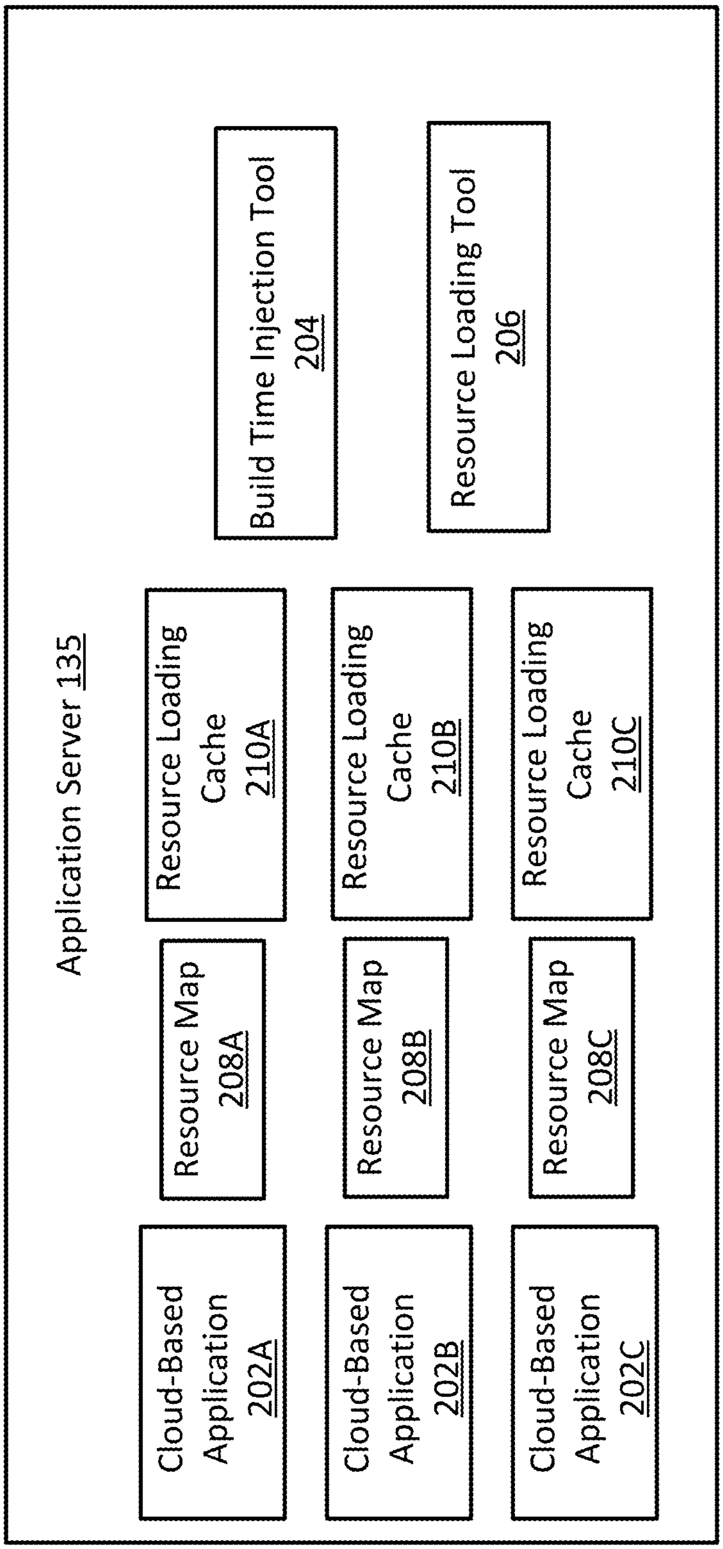
FIG. 2 shows an example application server for generating a resource map using a build time injection tool 204 and a resource loading cache using a resource loading tool for a cloud application.

Referring now to FIG. 2, FIG. 2 shows an example application server 135 for generating a resource map 208 using a build time injection tool 204 and a resource loading cache 210 using a resource loading tool 206 for a cloud application 202. The application server 135 can be a physical device, a virtual machine, or built on a container platform. As illustrated, the application server 135 can host multiple cloud applications, such as cloud application 202A, cloud application 202B, and cloud application 202C, which may be referred to herein individually as a cloud application 202 or collectively as the cloud applications 202. The application server 135 includes a build time injection tool 204. The build time injection tool 204 can be a software module on the application server 135. For example, the build time injection tool 204 is created as a command line program in the execution environment for the cloud applications 202 on the application server 135. The build time injection tool 204 can be specific to an execution environment. Alternatively, the build time injection tool 204 can be adaptable to more than one environment.

In some examples, the cloud applications 202 need the same execution environment, such as a JVM, and thus the same build time injection tool 204 is the used for all the cloud applications 202. In some examples, the cloud applications 202 need different execution environments. The build time injection tool 204 can be configured to adapt to different execution environments for different cloud applications 202. Alternatively, a build time injection tool 204 can be created for a particular execution environment. Thus, even though only one build time injection tool 204 is depicted in FIG. 2, multiple build time injection tools can be maintained on the application server for different cloud applications or different execution environments.

At build time, the build time injection tool 204 can access the source code for a cloud application 202. The cloud application references one or more resources in the source code. Resources can include libraries of functionality used by the cloud application during execution, web resources, additional files, or static content, such as bitmaps, layout definitions, user interface strings, animation instructions, which the cloud application uses during execution. In some examples, the resources are provided by one or more libraries of the cloud application, separate and independent from the source code. The libraries can be stored on the application server 135. Alternatively, or additionally, the libraries can be stored at a different location or the cloud which the application server 135 can access. The libraries can include one or more library files containing resources for cloud applications. The resources referenced in the source code of the cloud application can be a subset of all the resources contained in the library files. For example, a Java library has one or more JAR files containing Java classes and other resources, such as icons or property files, which may be referenced by a Java application. The resources can be referenced by identifiers in the source code. The source code can further include some address information regarding where the referenced resources are located.

The build time injection tool 204 can identify a subset of the resources referenced in the source code of a cloud application 202A. In some examples, the subset is the full set of resources referenced in the source code. In some examples, the subset includes fewer resources than the resources referenced in the source code. The build time injection tool can use the address information regarding the subset of the resources referenced to search the library files for the particular resources and identify the exact locations for the corresponding resources.

The build time injection tool 204 then generates a resource map 208A for a cloud application 202A based on the identified resources. The resource map 208A can include a list of the subset of the resources referenced and corresponding locations of the subset of the resources referenced within the one or more library files. The locations stored in the resource map can be uniform resource locators (URLs) or library paths, which can lead to the corresponding resources. Similarly, the build time injection tool 204 can generate resource maps for other cloud applications, such as a resource map 208B for cloud application 202B and a resource map 208C for cloud application 202C. The resource maps 208A-208C may be referred to herein individually as a resource map 208 or collectively as the resource maps 208. The resource maps 208 can be stored on the application server 135 as a resource. Alternatively, or additionally, the resource maps 208 can be uploaded to the cloud or maintained in a network-attached repository.

The application server 135 also includes a resource loading tool 206. The resource loading tool 206 can be a new tool created to access the resource map 208. Alternatively, the resource loading tool 206 is an updated version of a default resource loading tool configured to access the resource map 208. The resource loading tool 206 can be specific to an execution environment for a particular cloud application. For example, when the cloud applications 202A-202C are all Java applications, which need the same execution environment JVM, the resource loading tool 206 may be a class loader for all the Java applications. In some examples, the cloud applications 202 need different execution environments. The resource loading tool 206 can be configured to adapt to different execution environments for different cloud applications 202. Alternatively, a resource loading tool 206 can be created for a particular execution environment. Also, various resources for a specific cloud application 202 may require different types of resource loading tools. Thus, even though only one resource loading tool 206 is illustrated in FIG. 2, multiple resource loading tools can be maintained on the application server 1350 for different execution environments or different types of resources.

At runtime, the resource loading tool 206 can search for resources needed by cloud application 202A in corresponding resource map 208A. The resource loading tool 206 can access the resource map 208A, identify a location for a particular resource listed in the resource map 208A and access the particular resource based on the location identified in the resource map 208A. If the particular resource is not listed in the resource map 208A, the resource loading tool 206 can search library files, such as using a brute force approach, in the libraries of the cloud application until the resource is found or until all the library files are searched and the resource is not found.

In addition, to further help accelerate launch time for an application, the resource loading tool 206 can create a resource loading cache 210A to cache information about previously searched resources for cloud application 202A during the runtime. The information cached in the resource loading cache 210A can include names of the previously search resources and the corresponding search results. Thus, after a period of time or after a few searches in the resource map, a resource loading cache 210A is created, the resource loading tool 206 can search the resource loading cache 210A prior to searching the resource map 208A for a particular resource. However, the resource loading tool 206 can search a resource loading cache first even when the resource loading cache is empty. If the particular resource is not listed in the resource loading cache 210A, the resource loading tool 206 then searches the resource map 208A. If the particular resource is listed in the resource loading cache 210A, the resource loading tool 206 then identifies a corresponding search result. If the corresponding search result is a location within the library files, the resource loading tool 206 then accesses the particular resource based on the location within the library files. The resource loading tool 206 can return the particular resource as input to the cloud application. Alternatively, the resource loading tool 206 can provide the corresponding location to the cloud application. The location can be a URL or a library path. If the search result indicates that the previously searched resource is not found, then the resource loading tool 206 returns null to the cloud application. In some examples, the resource loading tool 206 can transmit a message to the cloud application 202A that the resource is not found. Meanwhile, the search result is cached to the resource loading cache 210. Similarly, a resource loading cache 210B can be created for cloud application 202B, and a resource loading cache 210C can be created for cloud application 202C. The resource loading caches 210 are generally specific to particular cloud applications. However, in some examples, the resource loading caches 210A-210C can be one unified cache.

When a cloud application 202 is updated or the library files are updated, the resources referenced by the cloud application may be updated. The resource map 208 may be updated at subsequent build times. The resource loading cache 210 can be cleared before a subsequent build time due to the modified application or JAR files. Alternatively, the resource loading cache 210 can be maintained for a predetermined period of time that may span multiple application executions. Thus, the resource loading tool 206 at current runtime can search the resource loading cache created during a previous runtime.

Figure 3:
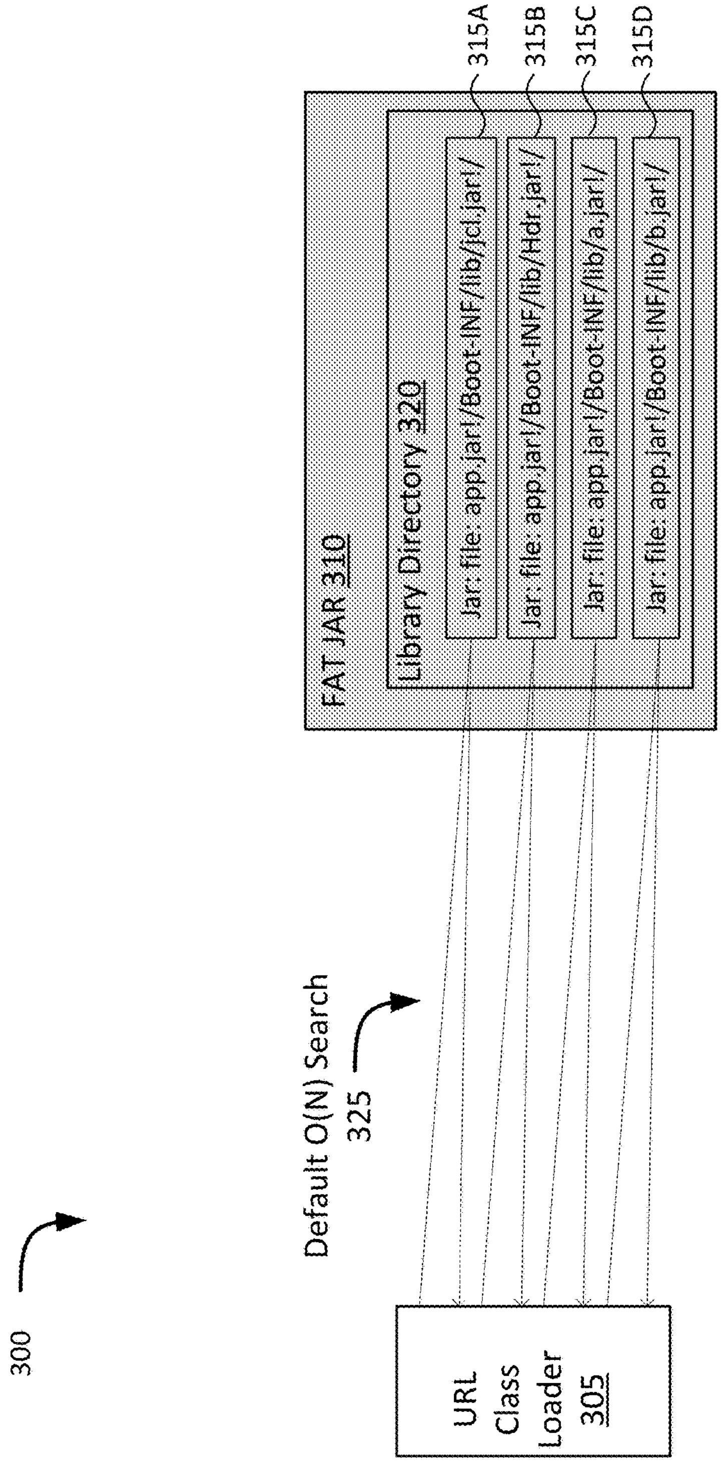
FIG. 3 shows a conventional process of locating a specific resource class within a cloud application.

Referring now to FIG. 3, FIG. 3 illustrates a conventional process 300 of locating a specific resource class within a cloud application, (e.g., a Java application). As illustrated, a default resource loading tool, such as a URL class loader 305 for a Java application, can search each JAR file 315A-315D individually in a fat JAR 310 until the URL class loader 305 finds the required resource. The Fat JAR 310 has a library directory 320 including all class files and resources together with their dependencies in the Java application. Using conventional techniques, the URL class loader 305 uses a linear search algorithm 325 with linear time complexity O(N), meaning that as the number of targets and paths to search increases, the time to perform the search proportionally increases, i.e., it is a brute-force search. The URL class loader iterates over each single JAR file until the first non-null result is returned as the found resource class. As can be appreciated, the iterative approach used by conventional techniques for identifying a requested resource class can be time consuming and prolong start-up time of the cloud application, especially when the cloud application may reference a large number of classes to load.

Figure 4:
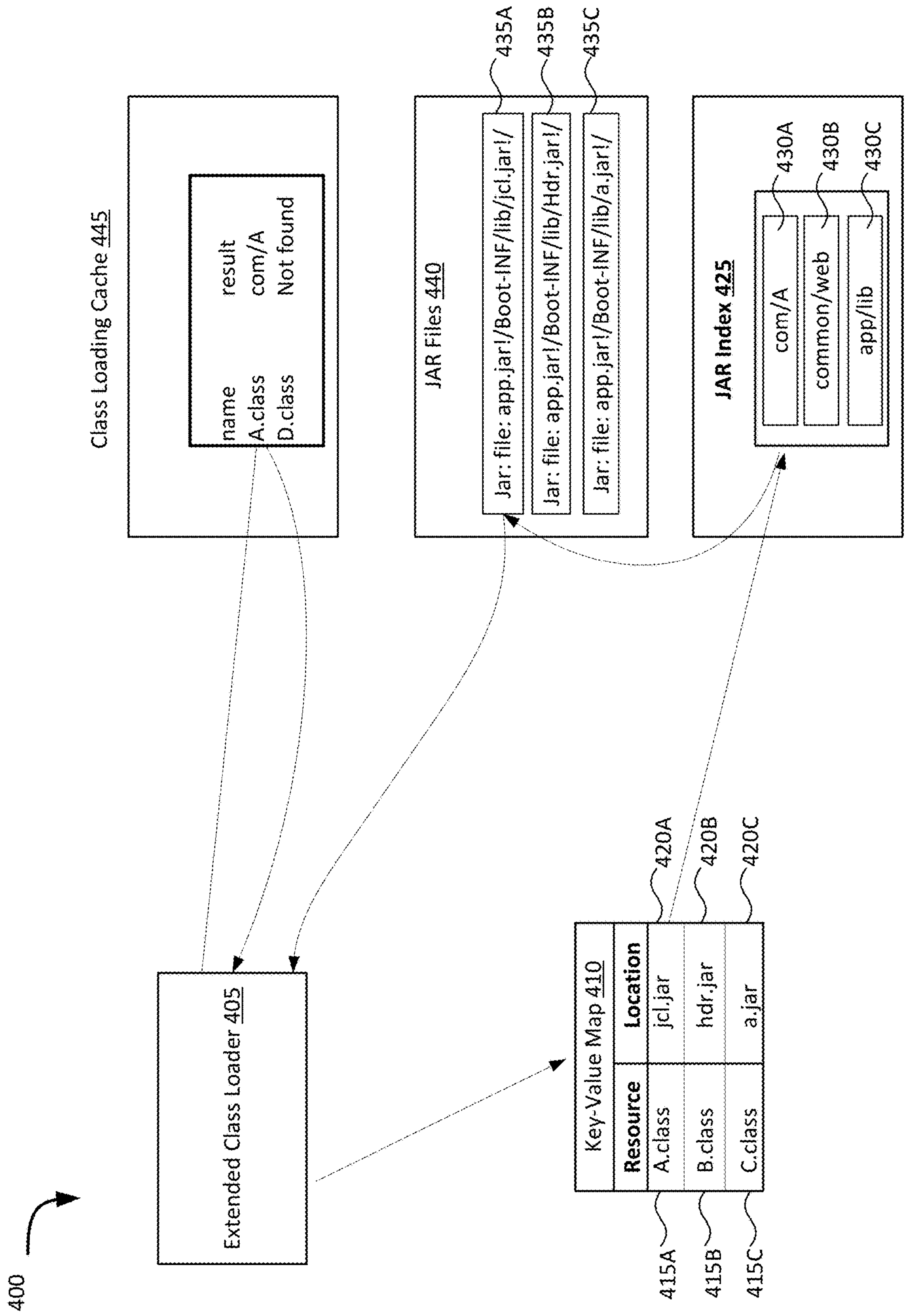
FIG. 4 shows an example process of accessing a particular resource by searching in a resource map constructed as a key-value map for a cloud application.

Referring now to FIG. 4, FIG. 4 illustrates an example process 400 of accessing a particular resource by searching in a resource map constructed as a key-value map 410 for a cloud application, according to the present disclosure. The cloud application is a Java application. An injection tool, such as the build time injection tool 204, may be used to create the key-value map 410 for the Java application at build time. The injection tool accesses source code of the Java application and identify resources referenced in the source code. The injection tool can then search the JAR files for the identified referenced resources based on any address information included in the source code and identify where a particular resource is located. The key-value map 410 includes a list of resources, such as 415A, 415B, and 415C, and corresponding locations, such as 420A, 420B, and 420C. In this example, the locations 420A-420C are JAR files containing the corresponding resources 415A-415C. In other examples, the locations are library paths or URLs for corresponding resources.

A resource loading tool 206 can be created or updated to search the key-value map 410 for accessing a particular resource. In this example, a default resource loading tool, such as a default class loader for the Java application, is extended to become an extended class loader 405 to search the key-value map 410 for a particular resource. To accelerate a start-up process of the Java application, the extended class loader 405 can look up the key-value map 410 instead of iterating the steps as shown in FIG. 3 to load the specific resource. As illustrated herein, if the resource "A.class" 415A is needed by the Java application at runtime, the extended class loader 405 can access the key-value map 410 and identify "A.class" and obtain the corresponding location, which is a JAR file named jcl.jar 420A. The extended class loader 405 can then look up a JAR index 425. The JAR index 425 is an index of paths 430A-430C for resources in corresponding JAR files. The extended class loader 405 can identify the "com/A" 430A in the JAR index is for the resource "A.class" 415A. Corresponding to "com/A" 430A is the library path for the requested resource "A.class" 415A within the jcl.jar file 435A in the library of JAR files 440. The extended class loader 405 can then load the "A.class" resource using the library path within the jcl.jar file 435A without searching through other or all JAR files. By using the key-value map 410 to identify the most likely JAR file to find a requested response, the extended class loader 405 can cover about a large number of resource lookups, for example 95% of all resource lookups, required to launch a cloud application, thereby rendering the whole lookup process to be much faster than conventional methodologies illustrated in FIG. 3.

In addition, FIG. 4 shows that the extended class loader 405 can also create a class loading cache 445 at runtime; however, this is an optional feature for an extended class loader. The class loading cache 445 can cache the search result of previously searched resources. The extended class loader 405 can access the class loading cache 445 for a particular resource prior to accessing the key-value map 410 or performing a brute-force search in the JAR files. For example, since the extended class loader 405 accessed the resource A.class by searching the key-value map 410 previously, the extended class loader 405 can cache this result in the class loading cache 445. If resource A.class is requested again at runtime, or in a subsequent execution, the extended class loader 405 can search the class loading cache 445 first and identify a search result for A.class. The search result shows a location com/A. The extended class loader 405 can access the resource A.class at the location com/A in the JAR index 425 without accessing the key-value map 410 or searching through the JAR files brute force. If the requested resource is not listed in the class loading cache 445, the extended class loader 405 can then access the key-value map 410 to locate the requested resource. When a specific resource is not found by looking up the key-value map 410, the extended class loader then may search all JAR files. If the specific resource still cannot be found after searching all JAR files, the extended class loader can cache in the class loading cache 445 that the specific resource is not found. For example, the extended class loader 405 can record in the class loading cache 445 that resource "D.class" is "not found" after searching all the JAR files. This way, when the resource "D.class" is requested again during runtime, the extended class loader 405 can indicate to the cloud application that the resource D.class is not found, without accessing the key-value map 410 or searching through all JAR files.

Figure 5:
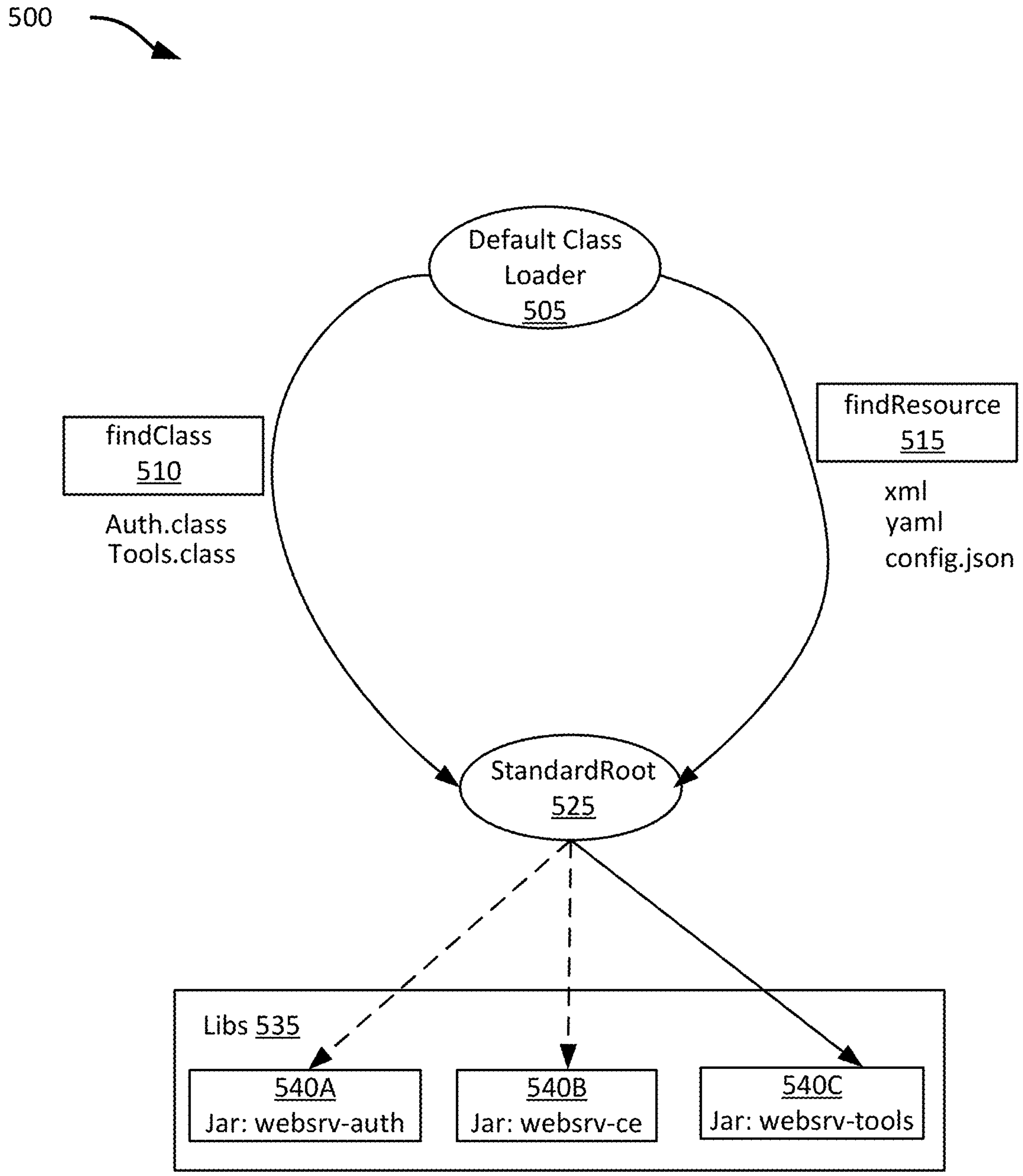
FIG. 5 shows a flow diagram of a default class loader searching for classes and resources.

Referring now to FIG. 5, FIG. 5 is a flow diagram 500 of a default class loader 505 for searching for classes and resources. The default class loader 505 can find specific classes, such as Auth.class and Tools.class, via the method findClass 510. Similarly, the default class loader 505 can find other specific resources, such as xml files, yaml files, and config.json files, via the method findResource 515. A default class loader 505 can be the original resource loading tool in the execution environment, which is not configured for accessing a resource map created by a build time injection tool described in the present disclosure. In other words, the default class loader 505 may employ a conventional process 300 as illustrated in FIG. 3 for identifying classes and resources. Thus, the default class loader 505 usually searches through the JAR files via either method 510 or method 515 until a certain class or resource is found in the JAR files from library 535. Once identified, the StandardRoot 525 can implement the identified class or resource found in the JAR files from library 535. For example, if a tools.class is requested, the default class loader 505 can search through the JAR files sequentially in an index or directory of JAR files, including JAR file websrv-auth 540A and JAR file websrv-ce 540B, until the requested tool class is found in the JAR file websrv-tools 540C, and then the StandardRoot 525 can implement the tools.class.

Figure 6:
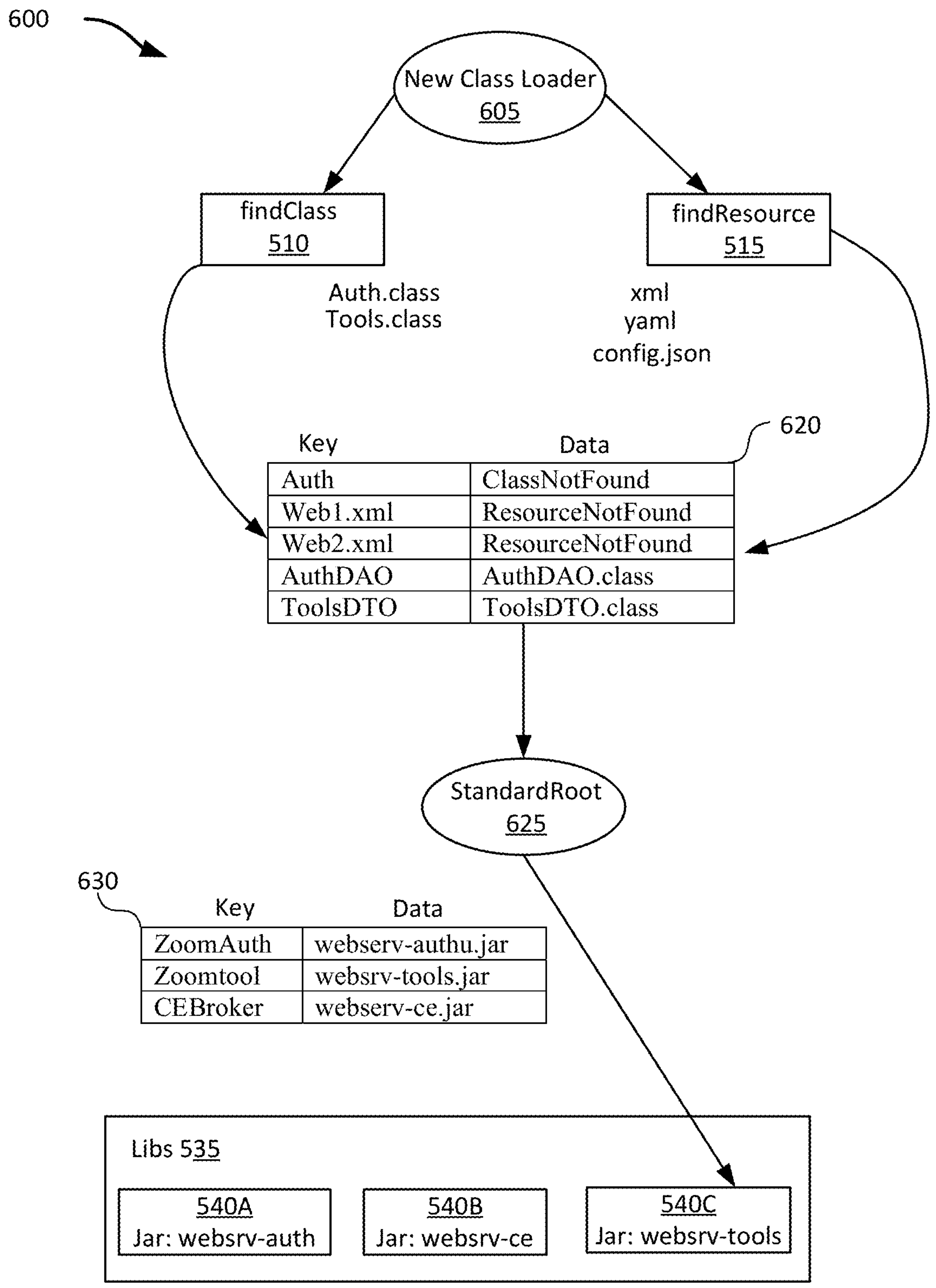
FIG. 6 shows an example flow diagram of a new class loader accessing classes and other resources during runtime by searching a resource map generated by an example injection tool.

Referring now to FIG. 6, FIG. 6 is an example flow diagram 600 of a new class loader 605 accessing classes and other resources during runtime by searching a resource map 630 generated by an example injection tool. As illustrated, the new class loader 605 is a resource loading tool. The new class loader 605 can be extended from a default class loader, such as the default class loader 505, for accessing the resource map 630. The new class loader 605 can also be created as instances using a specific class loader for delegation to access the resource map 630. Alternatively, the new class loader 605 can be created as an additional class loader in the execution environment configured for accessing the resource map 630.

The new class loader 605 is configured to search a resource loading cache 620 and a resource map 630 for accessing particular resources to speed up startup time of a cloud application. The new class loader 605 can find specific classes, such as Auth.class and Tools.class, via the same method findClass 510 used by the default class loader 505 as illustrated in FIG. 5. Similarly, the new class loader 605 can find other specific resources, such as xml files, yaml files, and config.json files, via the same method findResource 515 used by the default class loader 505 as illustrated in FIG. 5. When searching for a specific class, the new class loader 605 can look up the resource loading cache 620 first to see if the specific class was searched previously. If the location of the specific class is cached in the resource loading cache 620, the new class loader 605 can load the specific class directly from the location. If the specific class is listed in the resource loading cache 620 but the corresponding data indicates that the specific class is not found, then the new class loader 605 returns null to the cloud application. The new class loader 605 can also transmit a message to the cloud application indicating that the specific class is not found, without searching the resource map 630 or searching all library files. The resource loading cache 620 can be formatted as an index map, similar to a key-value map. Searching in the resource loading cache 620 can be optional. The new class loader 605 can directly search the resource map 630 for a class or another resource.

If the specific class is not listed in the resource loading cache 620, the new class loader 605 can then search the resource map 630 created by an example build time injection tool described in FIG. 2 at build time. As illustrated herein, the resource map 630 is a key-value map, including a key column and a data column. The key column lists names of the resources referenced by the cloud application. The data column includes location information of the corresponding resources. If the location of the specific class is listed in the resource map 630, the new class loader 605 can identify the data corresponding to the specific class in the resource map 630. As illustrated herein, the data is a specific JAR file containing the specific class. However, the data can also be a URL or a library path. The new class loader 605 then access the specific class at the corresponding JAR file, the corresponding URL, or the corresponding library path.

If the requested resource is not listed in the resource map 630, the new class loader 605 can search all the JAR files to see if the requested resource exists in any JAR files. If the requested resource is found in one or more of the JAR files, the resource loading cache 620 can be updated to include the resource name and corresponding location. If the requested resource is not found, the resource loading cache 620 can also be updated to indicate the requested resource is not found.

For example, when a Zoomtool class is requested, the new class loader 605 first searches the resource loading cache 620. The new class loader 605 determines that the Zoomtool class is not listed in the resource loading cache 620, thus no information about the Zoomtool class is cached. The new class loader 605 then searches the resource map 630. The resource map 630 shows that the Zoomtool class is in the JAR file websrv-tools.jar. The new class loader 605 can access the Zoomtool class from the JAR file websrv-tools 540C in the library 535 directly, without searching all the other JAR files, such as JAR file websrv-auth 540A and JAR file websrv-ce 540B. A resource implementing tool, such as StandardRoot 625 as illustrated, implements the Zoomtool class directly from the JAR file websrv-tools 540C. The StandardRoot 625 can be the same as the StandardRoot 520 or modified to coordinate with the new class loader 605. It can be appreciated that this is merely one example of how a resource implementing tool, such as the StandardRoot 625, implements the resource identified via a resource map 630, for a specific cloud application in a specific execution environment. Other applications in other execution environments may have a different process for implementing the resource. For example, the resource loading tool, such as the new class loader 605, may implement the resource after identifying the resource in the resource map 630 or one or more of the library files.

Figure 7:
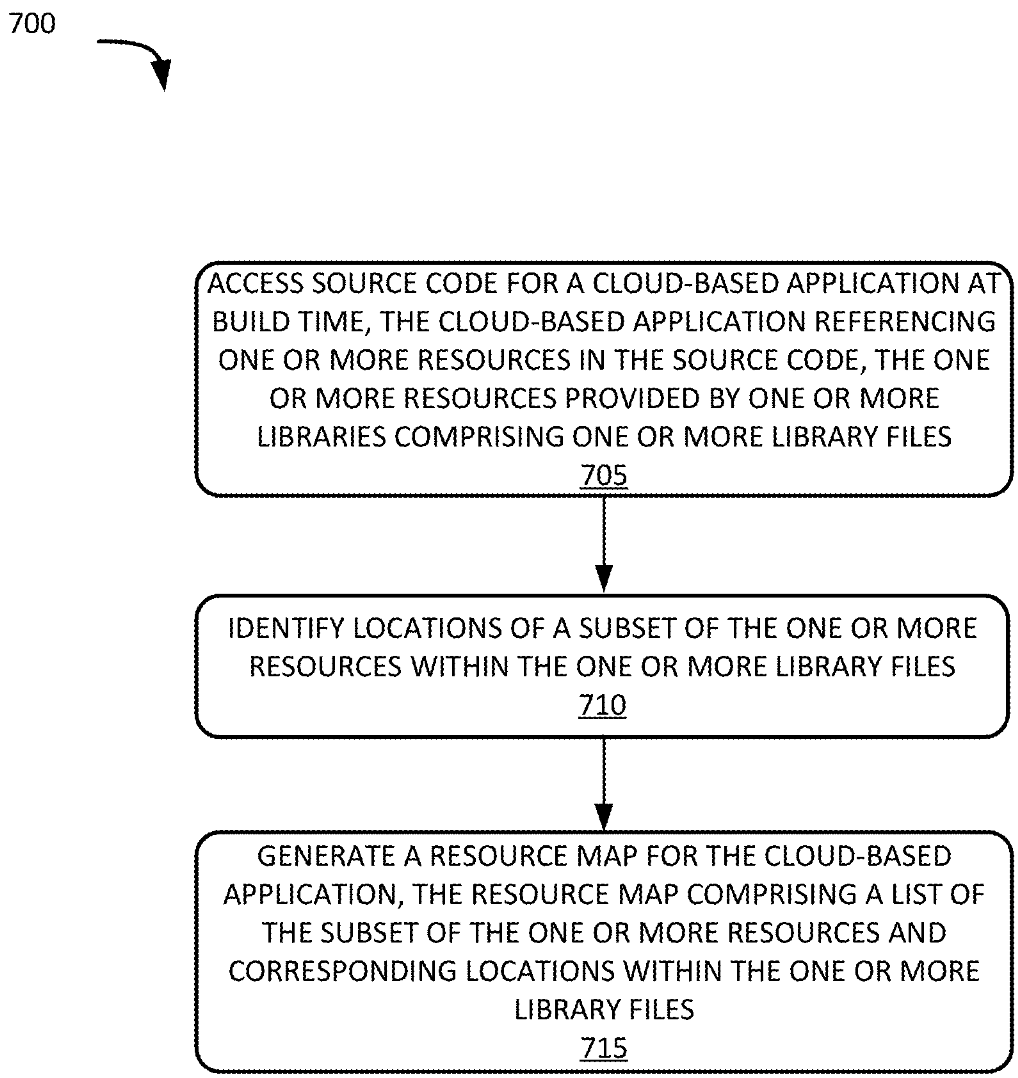
FIG. 7 shows an example method for generating a resource map for a cloud application.

Referring now to FIG. 7, FIG. 7 shows an example method 700 for generating a resource map 208 for a cloud application 202. At block 705, a build time injection tool 204 accesses source code for the cloud application 202 at build time. The cloud application 202 references one or more resources in the source code. The one or more resources can be referenced by unique identifiers in the source code. The source code may also include certain location information about the one or more referenced resources. The one or more resources are contained in one or more libraries of the cloud application. The one or more libraries can be stored on the application server 135. Alternatively, or additionally, the one or more libraries can be stored on the cloud. The one or more libraries can include one or more library files. When the cloud application is a java application, the one or more library files are one or more JAR files.

At block 710, the build time injection tool 204 identifies locations of a subset of the one or more resources within the one or more library files. The build time injection tool 204 can identify a subset of the one or more resources referenced in the source code. The subset can be the whole set of the one or more resources referenced in the source code. The subset can also be less than the whole set of the one or more resources referenced in the source code. The build time injection tool 204 can then identify the locations of the identified resources by searching the one or more libraries based on the limited location information provided in the source code. In some examples, the location information provided in the source code includes precise locations, such as URLs or library paths, for specific resources. Then the built time injection tool 204 can save some computation time for locating these specific resources.

At block 715, the build time injection tool 204 generates a resource map 208 for the cloud application 202. The resource map comprises a list of the subset of the one or more resources and corresponding locations within the one or more library files. The resource map may be a key-value map comprising keys and corresponding values. The keys can be names of the subset of the one or more resources and the corresponding values can be corresponding locations of the subset of the one or more resources, such as library paths within the one or more library files. The build time injection tool 204 can update the resource map 208 at a subsequent build time when the cloud application 202 or the one or more library files are updated. And while this example employs a key-value map, any suitable configuration for a resource map may be employed.

Figure 8:
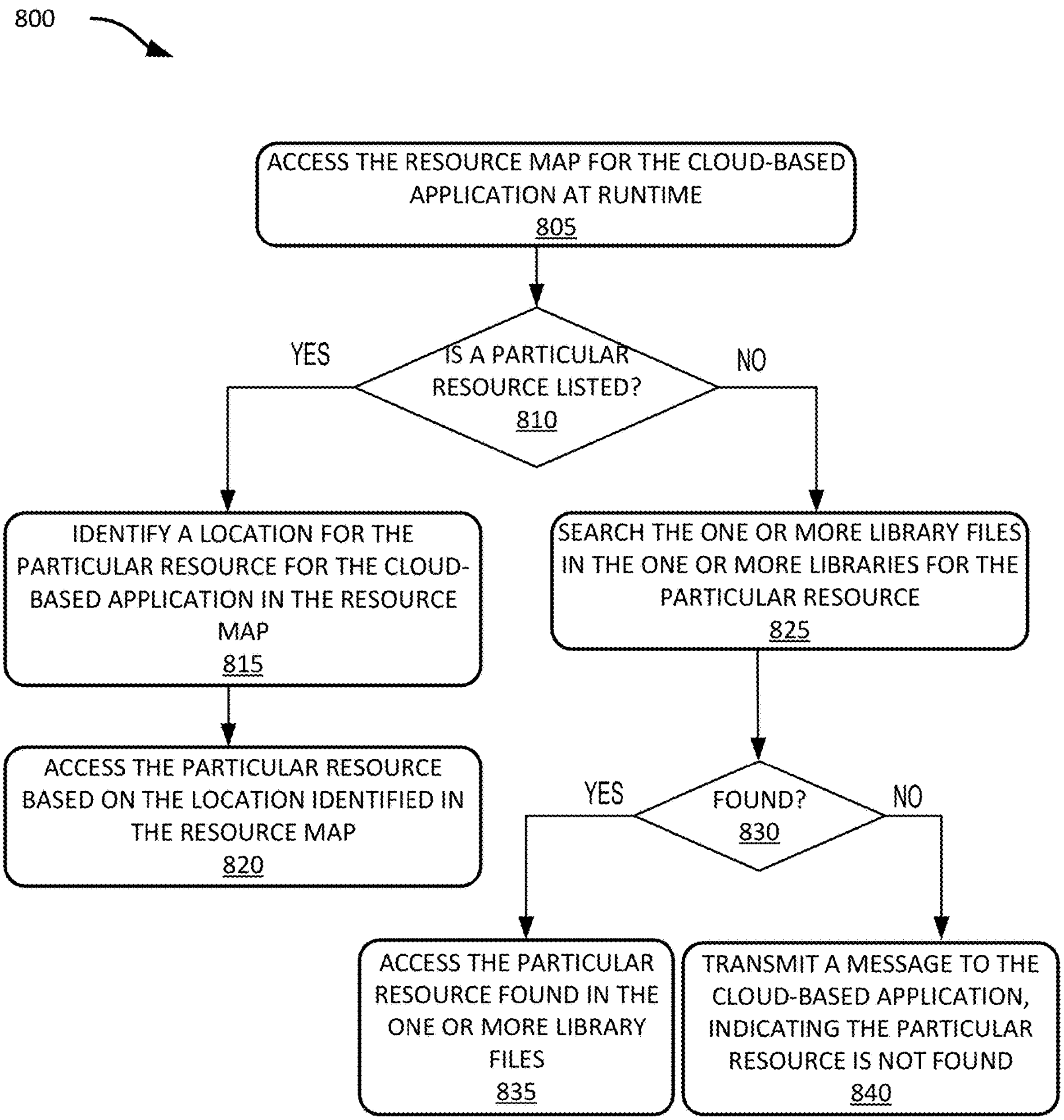
FIG. 8 shows an example method for accessing a particular resource using the resource map generated in FIG. 7.

Referring now to FIG. 8, FIG. 8 shows an example method 800 for accessing a particular resource using the resource map 208 generated in FIG. 7. At block 805, a resource loading tool 206 accesses the resource map 208 for a cloud application 202 at runtime. The resource loading tool 206 can be a new resource loading tool created for implementing the resource map 208. Alternatively, the resource loading tool 206 can be reconfigured from a default resource loading tool to access the resource map 208. For example, when the cloud application 202 is a Java application, the resource loading tool 206 is an extended class loader created from extending a default class loader.

At block 810, the resource loading tool 206 determines if a particular resource is listed in the resource map 208. If the particular resource is listed in the resource map 208, the method 800 proceeds to block 815. At block 815, the resource loading tool 206 identifies a location for the particular resource listed in the resource map 208. The location can be a URL, a library path, or a specific library file containing the particular resource.

At block 820, the resource loading tool 206 accesses the particular resource based on the location identified in the resource map 208. In some examples, the resource loading tool 206 returns the particular resource directly as an input to the cloud application. In some examples, the resource loading tool returns a location to the particular resource to the cloud application. The cloud application may employ another tool, such as a resource implementing tool, to access and implement the particular resource following the location. The location can be the same URL or library path as listed in the resource map. The resource loading tool can also create a link of a different format than the format of the locations listed in the resource map.

If the particular resource is not listed in the resource map 208, the method 800 proceeds from block 810 to the block 825. At block 825, the resource loading tool 206 searches the one or more library files in the one or more libraries for the particular resource. The resource loading tool can search the one or more library files with the conventional process 300 illustrated in FIG. 3. The resource loading tool 206 can search the one or more library files in order until the particular resource is identified; or until all the library files are searched and the particular resource is not found.

At block 830, the resource loading tool 206 determines if the particular resource is found in the one or more library files or not. If the particular resource is found in the one or more library files, the method 800 proceeds to block 835. At block 835, the resource loading tool 206 accesses the particular resource found in the one or more library files. In some examples, the resource loading tool 206 returns the particular resource as an input to the cloud application 202. In some examples, the resource loading tool 206 creates a link to the particular resource and return the link to the cloud application so that the cloud application can access the resource via the link. The link can be an URL or a library path. If the particular resource is not found in the one or more library files, the method 800 proceeds from block 830 to block 840. At block 840, the resource loading tool 206 returns null to the cloud application 202. In some examples, the resource loading tool 206 transmits a message to the cloud application 202, indicating the particular resource is not found.

Figure 9:
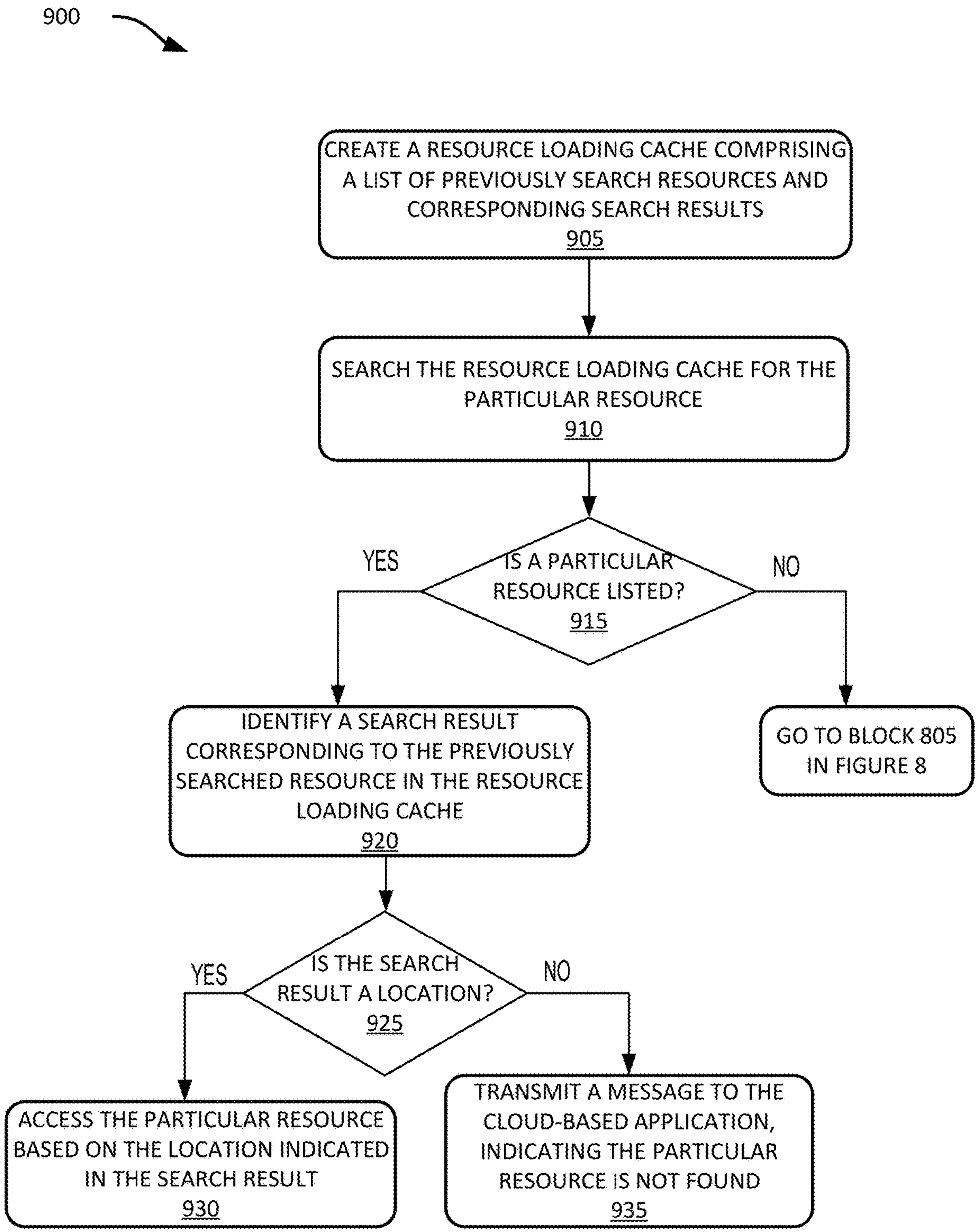
FIG. 9 shows an example method for searching a particular resource in a resource loading cache prior to searching the resource map generated in FIG. 7.

Referring now to FIG. 9, FIG. 9 shows an example method 900 for searching a particular resource in a resource loading cache 210 prior to searching the resource map 208 generated in FIG. 7. At block 905, the resource loading tool 206 creates a resource loading cache 210 comprising a list of previously searched resources and corresponding search results. In some examples, when the resource loading tool 206 completes a search for a particular resource, either via the resource map 208 or via brute-force search in one or more library files, the resource loading tool 206 can cache the search result on the application server 135 by generating a resource loading cache 210. The resource loading cache 210 stores the search results for previously search resources. The resource loading cache 210 can be in a format similar to a resource map, including a list of the previously searched resources and their corresponding search results. If the previously searched resource was found, the search result is a location of the previously searched resource, such as an URL, a library path, or a specific library file containing the previously searched resource. If the previously search resource was not found either in the resource map or the one or more libraries of the cloud application, the search result indicates the previously search resource is not found, such as "ResourceNotFound."

At block 910, prior to searching the resource map 208, such as described above with respect to FIG. 8, the resource loading tool 206 searches the resource loading cache 210 for the particular resource. The resource loading cache 210 is located on a processor of the application server, the resource loading tool 206 can access data in the resource loading cache 210, which may have more precise location information than is available in the resource map 208. Further, the resource loading cache 210 may include a search result for a previously searched resource that is not included in the resource map 208. It can save a lot of time to retrieve that result directly from the resource loading cache without searching the resource map 208 or the library files of the cloud application.

At block 915, the resource loading tool 206 determines if the particular resource is listed in the resource loading cache 210 as a previously searched resource. If the particular resource is not listed in the resource loading cache 210, the process proceeds to block 805 in method 800 illustrated in FIG. 8 to access the resource map 208. When the particular resource is not listed in the resource loading cache 210, it indicates that the particular resource has not been searched. Therefore, the resource loading tool 206 proceeds to search the resource map 208 for the particular resource.

If the particular resource is listed in the resource loading cache 210 as a previously searched resource, the method 900 proceeds to block 920. At block 920, the resource loading tool 206 identifies a search result corresponding to the previously searched resource in the resource loading cache 210. At block 925, the resource loading tool 206 determines if the search result indicates a location for the previously searched resource.

If the search result indicates a location for the previously searched resource, for example, a URL, a library path, or a library file containing the previously searched resource. The method 900 proceeds to block 930. At block 930, the resource loading tool 206 accesses the particular resource based on the location indicated in the search result. The resource loading tool 206 can return the particular resource as input to the cloud application. Alternatively, the resource loading tool 206 can return a location of the particular resource to the cloud application. The location can be the URL or the library path cached in the resource loading cache 210. Alternatively, the resource loading tool 206 can create a path of a different format than the URL or the library path for the cloud application 202 to retrieve the particular resource.

If the search result indicates the previously searched resource is not found, the method 900 proceeds from block 925 to block 935. At block 935, the resource loading tool 206 transmits a message to the cloud application, indicating the particular resource is not found. When the search result indicates that the previously searched resource is not found, it indicates that the previously searched resource is not listed in the resource map or found in the one or more libraries of the cloud application. Alternatively, the resource loading tool 206 returns null to the cloud application.

Figure 10:
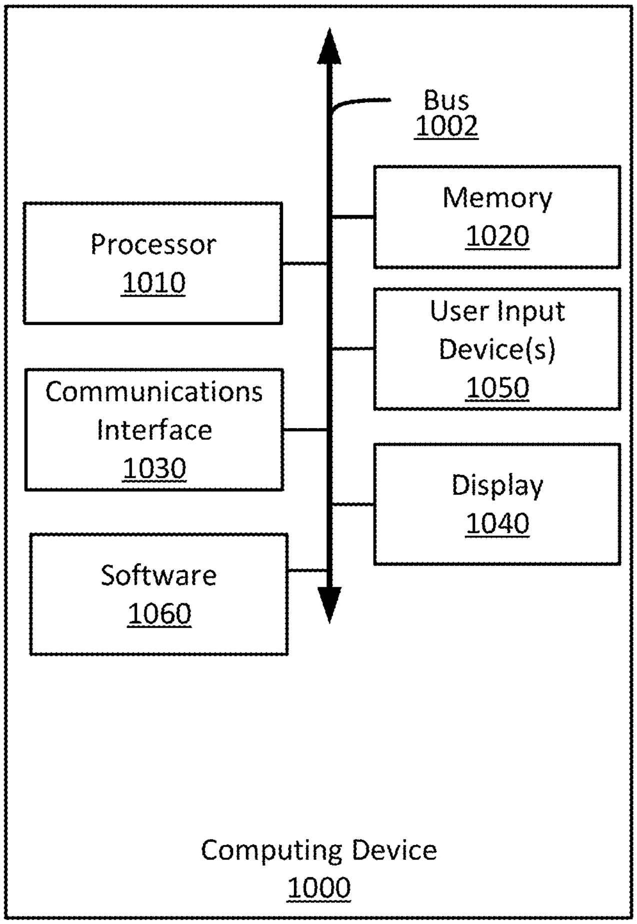
FIG. 10 shows an example computing device suitable for use with example systems and methods for accelerating launching of cloud applications in this disclosure.

Referring now to FIG. 10, FIG. 10 shows an example computing device 1000 suitable for use in example systems or methods of this disclosure. The example computing device 1000 includes a processor 1010 which is in communication with the memory 1020 and other components of the example computing device 1000 using one or more communications buses 1002. The processor 1010 is configured to execute processor-executable instructions stored in the memory 1020 to perform one or more methods for launching cloud applications with reduced start-up time, such as methods 700, 800 and 900. In some embodiments, the computing device may include software 1060 for executing one or more methods described herein, such as for example, one or more steps of methods 700, 800, or 900. The computing device, in this example, also includes one or more user input devices 1050, such as a keyboard, mouse, touchscreen, video input device (e.g., one or more cameras), microphone, etc., to accept user input. The example computing device 1000 also includes a display 1040 to provide visual output to a user.

The example computing device 1000 also includes a communications interface 1030. In some examples, the communications interface 1030 may enable communications using one or more networks, including LAN, WAN (e.g., the Internet), metropolitan area network ("MAN"), point-to-point or peer-to-peer connection, etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method, comprising:

identifying, by an injection tool on an application server, one or more resources referenced in source code of a cloud application, the application server hosting the injection tool, a resource loading tool, and one or more cloud applications, the injection tool being non-intrusive to the one or more cloud applications, the one or more resources being provided by one or more libraries comprising one or more library files, the one or more resources comprising at least one resource associated with launching the cloud application;

determining, by the injection tool, locations of the one or more resources within the one or more library files, comprising searching the one or more library files based on partial location information associated with the one or more resources in the source code;

generating, by the injection tool, a resource map for the cloud application, the resource map comprising a list of names of the one or more resources and corresponding locations within the one or more library files, the corresponding locations comprising one or more library paths to access the one or more resources;

receiving, by the application server, a request to launch the cloud application from a client device via network communication;

in response to receiving the request, searching, by the resource loading tool, the resource map to identify a location for the at least one resource associated with launching the cloud application; and launching, by the resource loading tool, the cloud application on the client device comprising loading the at least one resource based on the location identified from the resource map.

2. The method of claim 1, wherein:

the resource map is a key-value map;

the key-value map comprises keys and corresponding values;

the keys are the names of the one or more resources and the corresponding values are the corresponding locations of the one or more resources; and the corresponding locations are library paths within the one or more library files.

3. The method of claim 1, wherein the cloud application is a Java application, wherein the one or more library files are Java Archive (JAR) files.

4. The method of claim 1, further comprising updating the resource map at a subsequent build time when the cloud application is updated.

5. The method of claim 1, further comprising:

accessing, by the resource loading tool during a current runtime of the cloud application, the resource map;

identifying, by the resource loading tool during the current runtime, a location for a particular resource listed in the resource map associated with executing a particular functionality of the cloud application; and accessing, by the resource loading tool during the current runtime, the particular resource based on the location identified in the resource map to execute the particular functionality of the cloud application.

6. The method of claim 5, further comprising:

determining, by the resource loading tool, that the particular resource is not listed in the resource map; and searching, by the resource loading tool, the one or more library files in the one or more libraries for the particular resource in response to determining that the particular resource is not listed in the resource map.

7. The method of claim 5, further comprising:

prior to accessing the resource map during the current runtime, creating, by the resource loading tool during a previous runtime, a resource loading cache comprising a list of previously searched resources and corresponding search results;

searching, by the resource loading tool during the current runtime, the resource loading cache for the particular resource;

identifying, by the resource loading tool, the particular resource as a previously searched resource listed in the resource loading cache; and providing, by the resource loading tool, a search result corresponding to the previously searched resource in the resource loading cache.

8. The method of claim 7, wherein the search result is a library path corresponding to the previously searched resource, wherein the method further comprises accessing, by the resource loading tool, the particular resource via the library path to execute the particular functionality of the cloud application, without searching the particular resource in the resource map.

9. The method of claim 7, wherein the search result indicates that the previously searched resource is not found.

10. A system comprising:

a non-transitory computer-readable medium;

a communications interface; and a processor communicatively coupled to the non-transitory computer-readable medium and the communications interface, the processor configured to execute processor-executable instructions stored in the non-transitory computer-readable medium to:

identify, by an injection tool on an application server, one or more resources referenced in a source code of a cloud application, the application server hosting the injection tool, a resource loading tool, and one or more cloud applications, the injection tool being non-intrusive to the one or more cloud applications, the one or more resources provided by one or more libraries comprising one or more library files, the one or more resources comprising at least one resource associated with launching the cloud application;

determine, by the injection tool, locations of the one or more resources within the one or more libraries, comprising searching the one or more library files based on partial location information associated with the one or more resources in the source code;

generate, by the injection tool, a resource map for the cloud application, the resource map comprising a list of names of the one or more resources and corresponding locations within the one or more library files, the corresponding locations comprising one or more library paths to access the one or more resources;

receive, by the application server, a request to launch the cloud application from a client device via network communication;

in response to receiving the request, search, by the resource loading tool, the resource map to identify a location for the at least one resource associated with launching the cloud application; and launch, by the resource loading tool, the cloud application on the client device comprising loading the at least one resource based on the location identified from the resource map.

11. The system of claim 10, wherein:

the cloud application is a Java application;

the one or more library files are one or more Java Archive (JAR) files;

the resource map is a key-value map;

the key-value map comprises keys and corresponding values;

the keys are the names of the one or more resources and the corresponding values are the corresponding locations of the one or more resources; and the corresponding locations are library paths within the one or more JAR files.

12. The system of claim 10, wherein the one or more processors are configured to execute further processor-executable instructions stored in the non-transitory computer-readable medium to:

access, by the resource loading tool during a current runtime of the cloud application, the resource map;

identify, by the resource loading tool during the current runtime, a location for a particular resource listed in the resource map associated with executing a particular functionality of the cloud application; and access, by the resource loading tool during the current runtime, the particular resource based on the location identified in the resource map to execute the particular functionality of the cloud application.

13. The system of claim 12, wherein the one or more processors are configured to execute further processor-executable instructions stored in the non-transitory computer-readable medium to:

determine, by the resource loading tool, that the particular resource is not listed in the resource map; and in response to determining that the particular resource is not listed in the resource map, search, by the resource loading tool, the one or more library files in the one or more libraries for the particular resource.

14. The system of claim 12, wherein the one or more processors are configured to execute further processor-executable instructions stored in the non-transitory computer-readable medium to:

prior to accessing the resource map during the current runtime, create, by the resource loading tool during a previous runtime, a resource loading cache comprising a list of previously searched resources and corresponding search results;

search, by the resource loading tool during the current runtime, the resource loading cache for the particular resource;

identify, by the resource loading tool, the particular resource as a previously searched resource listed in the resource loading cache; and provide, by the resource loading tool, a search result corresponding to the previously searched resource in the resource loading cache.

15. The system of claim 14, wherein the search result is a library path corresponding to the previously searched resource, wherein the one or more processors are configured to execute further processor-executable instructions stored in the non-transitory computer-readable medium to:

access, by the resource loading tool, the particular resource via the library path to execute the particular functionality of the cloud application, without searching the particular resource in the resource map.

16. The system of claim 14, wherein the search result indicates that the previously searched resource is not found.

17. A non-transitory computer-readable medium comprising processor-executable instructions configured to cause one or more processors to:

identify, by an injection tool on an application server, one or more resources referenced in a source code of a cloud application, the application server hosting the injection tool, a resource loading tool, and one or more cloud applications, the injection tool being non-intrusive to the one or more cloud applications, the one or more resources provided by one or more libraries comprising one or more library files, the one or more resources comprising at least one resource associated with launching the cloud application;

determine, by the injection tool, locations of the one or more resources within the one or more libraries, comprising searching the one or more library files based on partial location information associated with the one or more resources in the source code;

generate, by the injection tool, a resource map for the cloud application, the resource map comprising a list of the one or more resources and corresponding locations within the one or more library files, the corresponding locations comprising one or more library paths to access the one or more resources;

receive, by the application server, a request to launch the cloud application from a client device via network communication;

in response to receiving the request, search, by the resource loading tool, the resource map to identify a location for the at least one resource associated launching the cloud application; and launch, by the resource loading tool, the cloud application on the client device comprising loading the at least one resource based on the location identified from the resource map.

18. The non-transitory computer-readable medium of claim 17, further comprising processor-executable instructions configured to cause one or more processors to:

update the resource map at a subsequent build time when the cloud application is updated.

19. The non-transitory computer-readable medium of claim 17, further comprising processor-executable instructions configured to cause one or more processors to:

access, by the resource loading tool during a current runtime of the cloud application, the resource map;

identify, by the resource loading tool during the current runtime, a location for a particular resource listed in the resource map associated with executing a particular functionality of the cloud application; and access, by the resource loading tool during the current runtime, the particular resource based on the location identified in the resource map to execute the particular functionality of the cloud application.

20. The non-transitory computer-readable medium of claim 19, further comprising processor-executable instructions configured to cause one or more processors to:

prior to accessing the resource map during the current runtime, create, by the resource loading tool during a previous runtime, a resource loading cache comprising a list of previously searched resources and corresponding search results;

search, by the resource loading tool during the current runtime, the resource loading cache for the particular resource;

identify, by the resource loading tool, the particular resource as a previously searched resource listed in the resource loading cache; and provide, by the resource loading tool, a search result corresponding to the previously searched resource in the resource loading cache.

* * * * *